April 28, 1959     A. R. HOWELL     2,883,828

POWER PLANT INCORPORATING A DYNAMIC COMPRESSOR

Filed Nov. 10, 1955     5 Sheets-Sheet 1

Inventor
ALUN RAYMOND HOWELL
By P. J. Schmit
Attorney

April 28, 1959   A. R. HOWELL   2,883,828
POWER PLANT INCORPORATING A DYNAMIC COMPRESSOR
Filed Nov. 10, 1955   5 Sheets-Sheet 3

Inventor
ALUN RAYMOND HOWELL
By
P. J. Schmitz
Attorney

United States Patent Office 2,883,828
Patented Apr. 28, 1959

2,883,828

POWER PLANT INCORPORATING A DYNAMIC COMPRESSOR

Alun R. Howell, Cove, Farnborough, England, assignor to the Minister of Supply, in Her Majesty's Government of the United Kingdom of Great Britain and Northern Ireland, London, England Application November 10, 1955, Serial No. 546,026

Claims priority, application Great Britain November 10, 1954

10 Claims. (Cl. 60—35.6)

This invention relates to power plant for an aircraft or missile incorporating a dynamic compressor. Conventional gas turbine plant, either for developing shaft power or for producing the jet for a jet-propelled aircraft, includes such a compressor driven by the turbine and supplying air to a combustion chamber which supplies combustion products to the turbine as motive fluid therefor. In an alternative form of jet engine for aircraft, the so-called turbo-rocket, a dynamic compressor is driven by a turbine receiving, as motive fluid, combustion products from a rocket combustion chamber burning rocket fuel, that is to say either a true fuel and an oxidant, or a monopropellant, combustion taking place independently of atmospheric air. One form of such plant, including an arrangement with axial flow turbine blades disposed around axial flow compressor blades, is set forth in co-pending patent application No. 425,003. Another form of jet engine, the "flash jet," wherein a dynamic compressor is driven by a turbine receiving, as motive fluid, vaporised fuel from a flash boiler or equivalent heated by the combustion of the fuel vapor in the air downstream of the compressor is set forth in co-pending patent application No. 507,968.

The present invention is concerned primarily with the driving of the compressor or fan of a jet propulsion plant. Hitherto compressors in fluid-power plant have been driven by turbines deriving their circumferential motion from the motion of gas normal to the circumferential direction—i.e. from the motion of an axial flow or a radial flow of gas. One aspect of the present invention consists broadly in utilising the motion of gas in the circumferential direction or tangentially thereto. Thus a jet propulsion plant for an aircraft or missile according to the present invention comprises a tubular main duct having an intake for atmospheric air at its upstream end, a propulsion nozzle discharging to atmosphere at its downstream end and a dynamic compressor having a bladed rotor located in the main duct to compress the air stream through the duct, in combination with means for generating a high velocity stream of gas independent of atmospheric air and a plurality of nozzles connected to receive said gas and located to discharge jets of the gas substantially tangentially into the main duct to drive the rotor. According to one feature of the present invention a dynamic compressor is driven by the reaction of gas jets emitted from the compressor rotor blades tangentially to the direction of motion of the blades or so that the reaction has a substantial tangential component. The motive fluid passes up through the hollow interior of compressor rotor blades and may leave through nozzle openings in the trailing edges, particularly in the neighborhood of the blade-tips. In a multi-stage compressor the reaction nozzles are preferably located in the last row of rotor blades. The reaction nozzles may however be in the shroud which surrounds and is secured to the tips of the blading.

The gas which discharges from the nozzles in the blades may be combustion products from a rocket combustion chamber which, on discharge, mix with the air passing through the compressor. Preferably however the rocket gases discharged from the nozzles flow at first in a duct separated from the duct for the main air stream through the compressor so that the discharge gases may diffuse before dilution by mixing with the main air stream. The gas may however be vaporized fuel (in a flash jet) which is kept separate from the air stream or mixes with only part of the air stream. The hot gases from the rocket motor or a flash boiler enter the interior of the rotor and thence pass through radial passages in the rotor body and blading to the discharge nozzles; these passages are preferably well heat insulated from the walls of the rotor body and blading by stagnant air spaces or spaces through which coolant fluid may pass.

To keep the discharged gas or fuel vapor separate from the main air stream through the compressor the reaction nozzles discharge from outside the enveloping shroud, which serves to segregate gas from air.

According to another feature of the invention, nozzles admit jets of rocket gas or vaporized fuel tangentially into a helical vortex chamber from which they pass to a turbine in a stream having a rotary component of motion, the turbine being driven by the angular momentum of the stream. The turbine is connected to drive a compressor or fan which discharges a compressed air stream to mix with the stream of rocket gas or vaporized fuel, the mixture burning and discharging through a nozzle as a propulsive jet. The compressed air stream and the stream of rocket gas or vaporized fuel may flow together either upstream or downstream of the turbine; in the latter case the plant may resemble a conventional gas turbine plant but having a main combustion chamber into which rocket gas or vaporized fuel is discharged tangentially or circumferentially. In addition, nozzles arranged to discharge rocket gas or vaporized fuel may be located at the tips of the compressor rotor blades as previously set forth.

In the turbo-rocket the only gas turbine is that driven by the rocket products, the compressor serving only to provide air for mixing with the rocket products to form a propulsive jet which may be augmented by burning in the air unburnt rocket fuel or additional fuel; the device is in effect a boosted rocket. A high velocity stream of gas comprising combustion products from a rocket combustion chamber or vaporized fuel may however be discharged, occasionally, from reaction nozzles in the compressor rotor blading or blade shroud of the compressor of an orthodox gas turbine, to augment the power output of the turbine when desired. The gas may additionally or alternatively be discharged from nozzles in the rotor blading or blade shroud of the turbine itself, or either directly or through a helical vortex chamber (as previously set forth) into an auxiliary turbine coupled to the main turbine or through auxiliary blading around the compressor as set forth in the said copending patent applications or through auxiliary blading around the main turbine blades. Thus a further feature of the inention consists in a rocket-boosted gas-turbine. This may for example provide a small unit suitable as a supplementary power unit for a ram-jet powered aircraft or missile.

In aircraft flying at supersonic speeds the heating of exposed surfaces of the aircraft may be very considerable, necessitating the cooling of much of the aircraft structure, and sufficient heat may be available for vaporizing much or all of the fuel. Thus in a modification of the "flash-jet," according to another feature of the present invention, heat from the cooling system for the structure is used, to vaporize fuel and provide a high velocity stream of fuel vapor. There may in addition be a small flash boiler or other means for vaporizing some of the fuel by heat from the combustion chamber and this can be used for starting; if these means be omitted, there may be some form of pilot burner for vaporizing some fuel for starting.

The pressure in the cooling ducts of the aforesaid or any other cooling system must be low in comparison with the high delivery pressure of the fuel. Hence a further feature of the invention consists broadly in the use of a heat exchanger serving to transfer heat from some fluid circulating around a low pressure cooling duct system, such as for example that of the preceding paragraph, to high pressure fuel gas, vapor or liquid. Preferably the heat is transferred to fuel in the liquid state to vaporize it, the latent heat of the fuel then being available for cooling the fluid in the cooling system, and the fuel can finally leave the heat exchanger as a gas or vapor at high pressure.

The accompanying diagrammatic drawings show, by way of illustration, a number of embodiments of the present invention. In the drawings, Figures 1 and 2 are sectional views of two forms of jet propulsion plant having a rocket driven compressor or fan in which gas discharge nozzles located peripherally on the compressor rotor blading are fed from an axially mounted rocket combustion chamber, the combustion chamber of Fig. 1 being stationary while that of Figure 2 is mounted for rotation with the compressor rotor.

Figure 1:
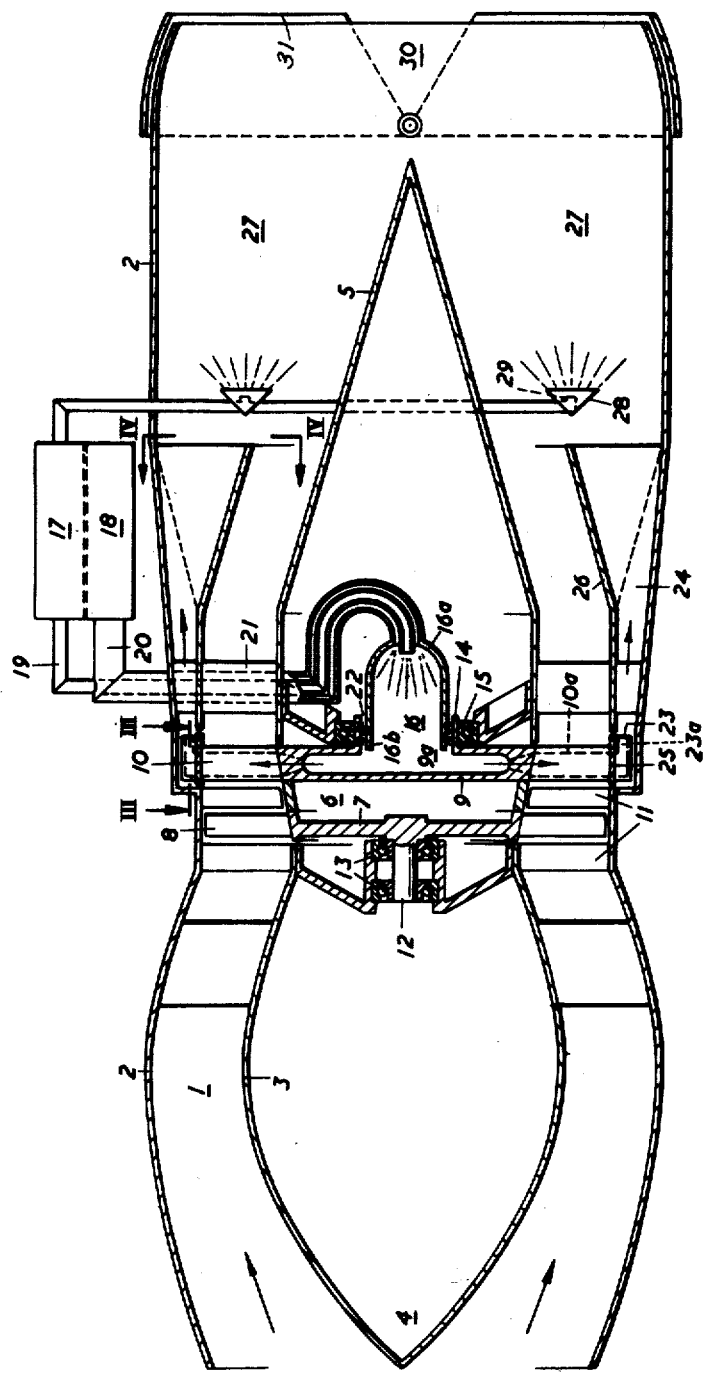
Figure 3:
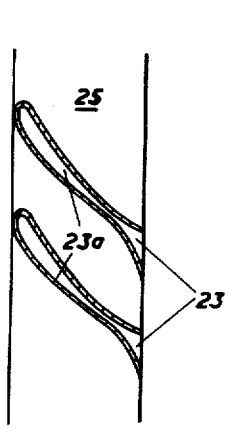
Figure 3 is a section on the line III—III of Figures 1 and 2.

The propulsion plant of Figure 1 comprises an annular main duct 1 defined by an outer casing 2 and an inner wall 3. At the upstream end of the plant, an annular air intake is formed by the outer casing 2 and an intake fairing 4, and at the downstream end of the plant, a jet pipe is formed by the outer casing 2 and an exhaust cone 5. An axial-flow compressor or fan 6 arranged on the axis of the plant has a rotor comprising a forward rotor disc 7 carrying rotor blades 8 and a rearward hollow rotor disc 9 spaced from but directly coupled to the forward rotor disc 7 and carrying hollow rotor blades 10, and a stator comprising stator blades 11 supported at their outer ends by the outer casing 2, the stator and rotor blades being located in the intake air stream through the duct. The compressor rotor is supported for rotation on a stub shaft 12 extending forwardly from the forward rotor disc 7 and journalled in a bearing 13 and on a flange 14 extending rearwardly from the rearward rotor disc 9 and journalled in a bearing 15, the flange 14 forming an axial inlet to the hollow interior 9a of the rotor 9. A rocket combustion chamber 16, located on the axis of the plant immediately to the rear of the hollow rotor disc 9, is supplied through an inlet portion 16a from fuel and oxidant tanks 17 and 18 through pipes 19 and 20 which extend across the main duct through a spider 21. The rocket combustion chamber is arranged to discharge rocket gas forwardly into the hollow interior 9a of the disc 9 through an outlet 16b which engages the flange 14 through a rotary seal 22. At the tip of each of the hollow compressor rotor blades 10, a nozzle 23 is arranged to discharge along an axis substantially tangential to the periphery of the rotor blading and at a small angle to the plane of the blading, as shown in Figure 3.

Figure 4:
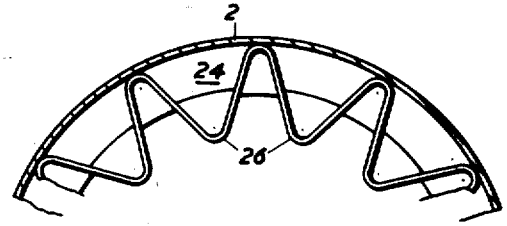
Figure 4 is a section on the line IV—IV of Figures 1 and 2.

Each nozzle 23 is formed with a passage 23a which connects, through the hollow interior 10a of the supporting blade 10 and the hollow interior 9a of the rotor disc 9 with the outlet 16b of the rocket combustion chamber 16 thus providing a discharge path for the rocket gas. The passage 23a is preferably of convergent-divergent configuration to present the minimum resistance to a supersonic gas flow. Although the rotor 9 and blades 10 will be heated by the passage through them of the rocket gas, the space separating the rotor discs 7 and 9 will serve to reduce conduction of heat to the disc 7 and blades 8. To prevent sudden dilution of the rocket gas discharged from the nozzles 23 by mixing with the compressed air stream delivered from the compressor, a short diffusing duct 24 for the rocket gas discharge is formed separate from the main duct by a shroud ring 25 supported on the blading 10 around which the nozzles 23 are located and downstream of the nozzles, by an annular shield 26 which at its downstream end is corrugated, as shown in Figure 4 to assist mixing of the rocket gas with the compressed air stream as the gas leaves the outlet duct 24. Downstream of the annular shield, the jet pipe formed between the outer casing 2 and the exhaust cone 5 constitutes a secondary combustion chamber 27 in which fuel rich rocket gas may continue to burn in the compressed air stream and, to assist combustion, flame stabilising baffles 28 are located at the upstream end of the chamber. Nozzles 29 connected to the fuel or oxidant supply may be located in the baffles 28 to inject fuel or oxidant or both into the chamber for reheating the rocket gas and air mixture. The main duct is provided with a variable area outlet or propulsion nozzle 30 formed by pivoted eyelid elements 31.

Figure 2:
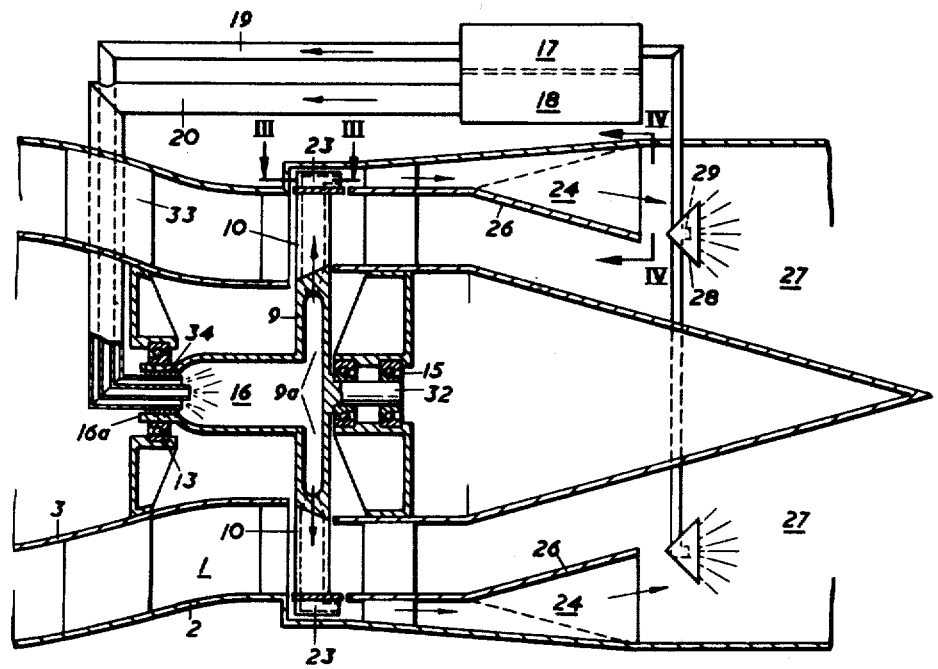

Figure 2 shows a modification of the jet propulsion plant of Figure 1 in which the compressor or fan has a single stage of rotor blading 10, the blades being hollow and mounted on a hollow rotor disc 9. The rocket combustion chamber 16 in this case in located on the forward side of the rotor disc 9 and is formed integral with the disc so that the rocket combustion chamber and rotor disc form a single rotor unit. This rotor unit is supported on the axis of plant at the forward end by the inlet portion 16a of the chamber 16 which is journalled in a bearing 13, and at the rearward end by a stub shaft 32 extending rearwardly from the rotor disc 9 and journalled in a rearward bearing 15. The stationary rocket fuel and oxidant pipes 19, 20 extend from the tanks 17, 18, across the main duct through a spider 33 upstream of the compressor. The pipes are formed coaxially at the inlet 16a to the combustion chamber and are connected to the combustion chamber through a rotary seal 34. The interior of the combustion chamber opens directly into the interior 9a of the hollow rotor disc 9 so that a continuous gas passage is provided from the combustion chamber through the hollow rotor disc 9 and hollow rotor blades 10 to the blade tips whose nozzles 23 are located as in the embodiment of Fig. 1 to discharge tangentially into the short gas duct 24.

In operation of the embodiments of Figs. 1 and 2, fuel and oxidant is injected into the rocket combustion chamber 16 and burnt to produce a high velocity discharge of rocket gas which is preferably rich in either fuel or oxidant in order to avoid overheating of the components enclosing the rocket gas path. The rocket gas discharged from the combustion chamber outlet into the interior 9a of the rotor disc 9 flows outwardly through the hollow rotor blades 10 and is discharged tangentially of the blade tips from the nozzles 23. A high degree of torque is then imparted to the compressor rotor by the reaction of the jets of rocket gas leaving the nozzles 23 and the compressor thus driven draws in atmospheric air and discharges a stream of compressed air to mix with the rocket gas in the secondary combustion chamber 27. To produce a stoichiometric mixture and to assist combustion in the chamber 27, additional rocket fuel, oxidant or hydrocarbon fuel such as kerosene is injected through the nozzles 29, and the reheated gas mixture is discharged as a propulsive jet through the variable area nozzle 30 formed by the eyelid-elements 31.

Figure 5:
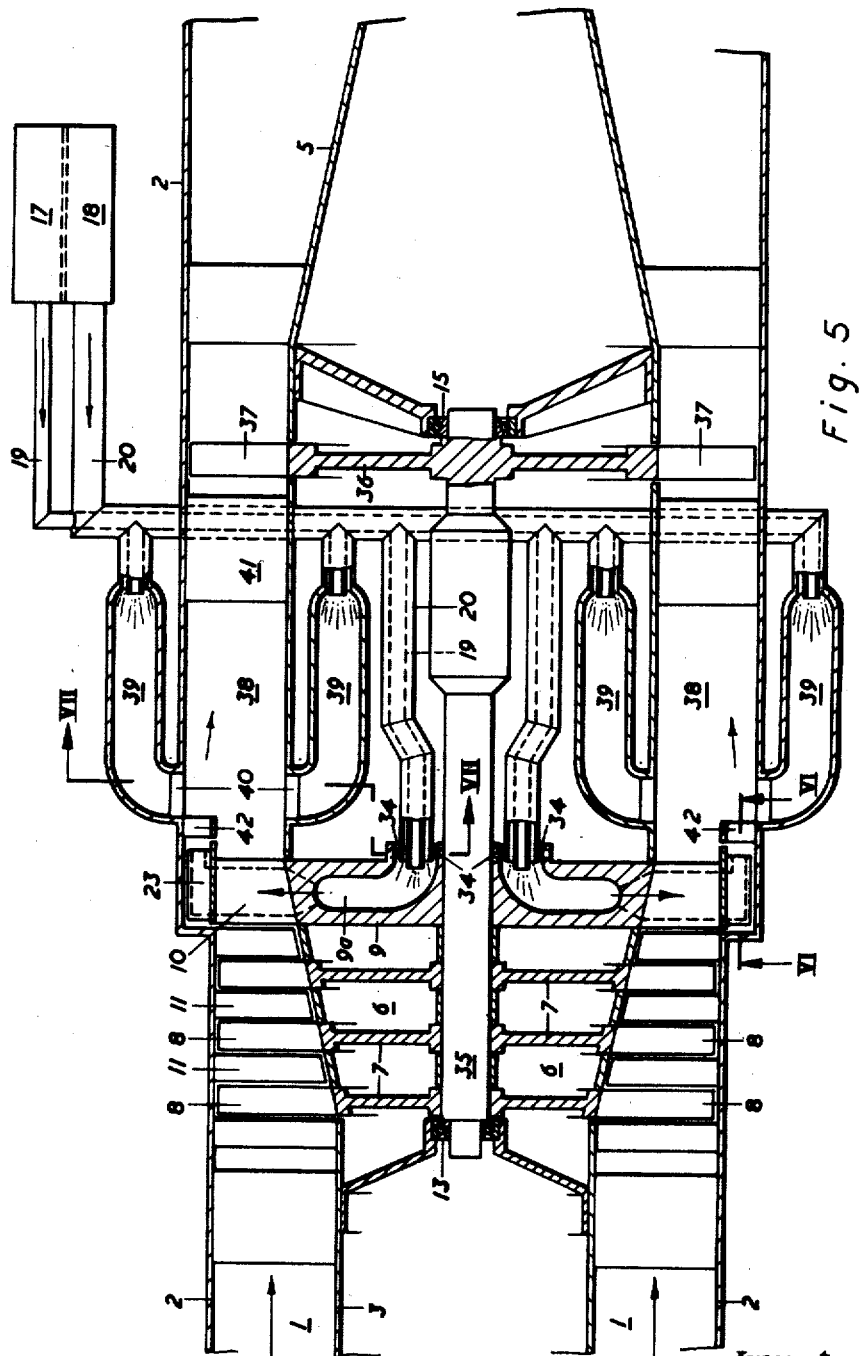
Figure 5 is a sectional view of a gas turbine plant having one set of gas discharge nozzles located peripherally on the compressor blading and a second set of nozzles located in the wall of the main combustion chamber.
Figure 6:
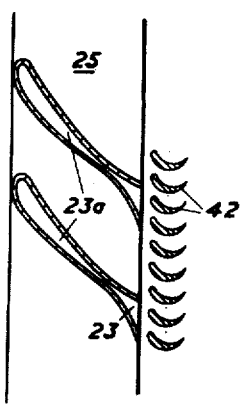
Figure 6 is a section on the line VI—VI of Figure 5.
Figure 7:
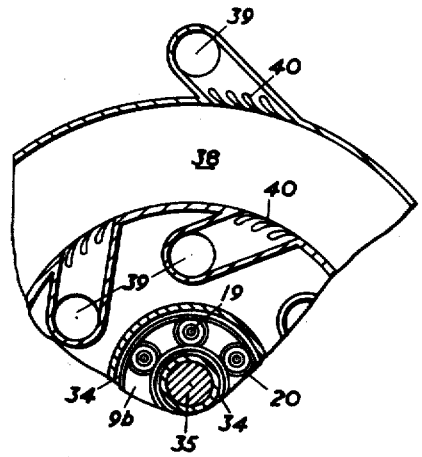
Figure 7 is a section on the line VII—VII of Figure 5.

Figure 5 shows an embodiment of the present invention applied to a gas turbine plant which comprises an annular main duct 1, formed with an intake and outlet as in the embodiment of Fig. 1. An axial flow compressor 6 located in the duct 1 to compress intake air comprises a stator formed by rows of stator blades 11 supported on the outer casing 2 of the duct and a rotor formed by three forward rotor discs 7 each carrying a row of blades 8 and a rearward hollow rotor disc 9 carrying a row of hollow blades 10 on which nozzles 23 are supported at the blade tips as in Figs. 1, 2 and 3; the four rotor discs are carried on a shaft 35 journalled at its forward end in a bearing 13. The rearward end of the shaft 35 is journalled in a bearing 15 and supports a turbine rotor disc 36 carrying axial-flow blading 37 located in the main duct 1 downstream of the compressor. Between the compressor blades 10 and the turbine blades 37, the main duct forms an annular combustion space 38 and a number of individual rocket combustion chambers 39 supplied from fuel and oxidant tanks 17, 18, through pipes 19, 20 are located both on the inside and outside of the annular combustion space 38 to discharge into the combustion space through guide vanes 40 as shown in Fig. 7. These vanes are located at the outlets of the combustion chambers and are curved to direct the rocket gas discharge substantially tangentially into the combustion space to produce a helical gas flow through this space. The pipes 19, 20 supplying the rocket combustion chambers on the inside of the annular combustion space extend through a spider 41 located across this space at an angle consistent with the rotary gas flow through the space. The hollow interior of the rearward compressor rotor disc itself forms a rocket combustion chamber 9a fed with fuel and oxidant from the tanks 17, 18, through the pipes 19, 20 which are connected to the inlet of the chamber 9a through an inlet ring 9b having rotary seals 34 on the inside and outside thereof as shown in Fig. 7. As shown in Fig. 6 guide vanes 42 are located immediately downstream of the nozzles 23 to deflect the rocket gas emitted from the nozzles into the annular combustion space 38.

In operation of this embodiment, the compressor is driven both by the turbine and by the reaction of rocket gas discharged from the nozzles 23. The rocket gas discharged from the combustion chambers 39 and deflected tangentially into the combustion space 38 by the guide vanes 40, flows in a helical path towards the turbine blades 37; accordingly no turbine inlet guide vanes are required as in a conventional gas turbine plant to deflect the gas flow into the turbine blading. The rocket gas which discharges from the nozzles 23, and so drives the compressor directly by reaction, flows initially along a curved path in a sense opposite to that of the gas within the combustion space 38, but the guide vanes 42 positioned immediately downstream of the nozzles 23 serve to deflect the flow of gas from these nozzles into the main stream flowing through the space 38.

Figure 8:
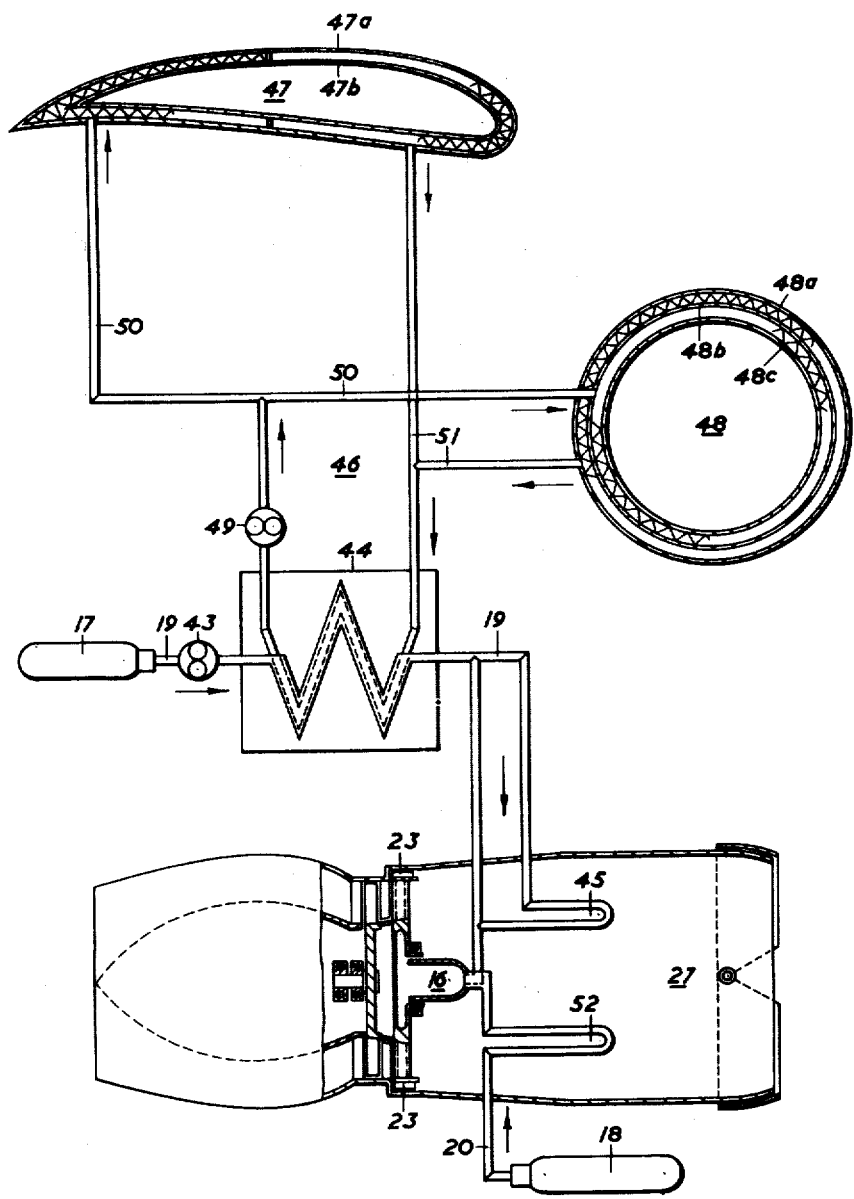
Figure 8 is a schematic diagram showing a heat exchanger deriving heat from the wing or fuselage of an aircraft or missile and arranged to deliver vaporized fuel to a jet propulsion plant according to the present invention.

Figure 8 illustrates apparatus for supplying vaporized fuel to the combustion chamber of the jet propulsion plant of a high speed aircraft or missile. The jet propulsion plant shown in Fig. 8 is that of Fig. 1 but the apparatus and method of operation are equally applicable to the propulsion plant of Figs. 1, 2 and 5 and to other embodiments of the present invention. The combustion chamber 16 is connected to the fuel tank 17 by the pipe 19 which extends through a pump 43 and a heat exchanger 44 which acts as a vaporizer in which the fuel is vaporized. The vapour may be further heated before entering the combustion chamber by passing through a flash boiler or superheater 45 located in the path of the combustion gases through the secondary combustion chamber 27. The heat exchanger is also connected in a closed low pressure circuit 46 around which a fluid is pumped, the fluid being either a gas, a vapour or a high boiling point liquid. The circuit extends through the wing or fuselage of the aircraft or missile which is heated by the friction of air passing over it at high speed and thus the passage of fluid around the circuit serves to cool the wing or fuselage. As shown in Fig. 8, the wing 47 has two covering skins 47a, 47b forming between them a passage extending in the outward direction of flow along the trailing portion of the wing and in the return direction along the leading portion of the wing, or vice versa. Similarly the fuselage 48 has three covering skins 48a 48b, 48c forming on each side of the middle skin 48b a passage extending in the outward direction of flow between the skins 48b and 48c and in the return direction between the skins 48b and 48a or vice versa. The fluid is pumped from the heat exchanger by a pump 49 through pipes 50 into the inlet ends of the fluid passages through the wing and fuselage and returned to the heat exchanger from the outlet ends of the fluid passages through pipes 51.

Oxidant led into the combustion chamber from the oxidant tank 18 through the pipe 20 may also be vaporized by passing through a second flash boiler 52 in the secondary combustion chamber 27.

If it is desired to drive the compressor by the discharge of vaporized fuel as such rather than by combustion products, the oxidant supply is omitted, and the combustion chamber 16 operates as, or is replaced by, a transfer passage for the fuel vapor between the pipe 19 and the inlet to the nozzles 23.

I claim:

1. A jet propulsion plant for an aircraft comprising a tubular main duct having an air intake at its upstream end and a propulsion nozzle at its downstream end, a compressor rotatably mounted within said tubular main duct and having its axis coinciding with the longitudinal axis of the tubular main duct, said compressor comprising a hollow rotor and a plurality of compressor rotor blades mounted thereon and extending into said main duct, a rocket combustion chamber having a discharge end arranged to discharge combustion gases into said hollow rotor, means to supply fuel and oxidant to said rocket combustion chamber wherein said supply of fuel is combusted into a high velocity stream of gas, reaction nozzle means positioned tangentially on the periphery of said rotor blades, passage means connecting said nozzles to the hollow of said rotor, whereby the compressor is driven by a reaction of the gases emitted from said nozzle means.

2. The combination of claim 1 and fuel nozzle means located within said main duct and downstream from said compressor, means to supply fuel to said fuel nozzle means whereby the emitted gases from the tangentially positioned nozzle means and air compressed by said compressor are mixed together in said main duct and burned with the fuel supplied by said additional nozzle means.

3. The combination of claim 2 and an annular shield located downstream of said compressor and dividing the main duct into two concentric ducts including an outer diffusing duct for receiving the gas discharged from said tangentially positioned nozzle means, a shroud ring supported on the periphery of said rotor blades and in alignment with said annular shield to form a continuation of said diffusing duct.

4. The combination of claim 1 wherein the discharge end of said rocket combustion chamber is coaxial with said hollow rotor, and a rotary sealing connection between said discharge end and said hollow rotor.

5. The combination of claim 1 wherein said rocket combustion chamber is positioned on the downstream side of said compressor.

6. The combination of claim 1 wherein said rocket combustion chamber is positioned on the upstream side of said compressor.

7. The combination of claim 1 and a turbine rotatably mounted about an axis coinciding with the longitudinal axis of said tubular main duct and connected to said compressor, said turbine being positioned downstream from said fuel nozzle means to receive the burned mixture of said emitted gases, said compressed air and said fuel.

8. The combination of claim 7 and additional rocket combustion chambers positioned between said turbine and said compressor means, means adjacent said additional combustion chambers and said nozzle means for tangentially deflecting gases from the discharge ends of said chambers and nozzle means into said main duct.

9. The combination of claim 1 comprising fuel vaporizing means for converting fuel into a vapor surrounding said fuel supply duct whereby the fuel is supplied to said combustion chamber in a vapor state.

10. The combination of claim 9, wherein said fuel vaporizing means includes a heat exchanger comprising a first fluid containing duct surrounding said fuel supply duct, a second fluid containing duct connected to said first duct so as to form a closed circuit, said second duct extending through a region of high temperature, means for circulating said fluid around the closed circuit, whereby said circulating fluid cools said region of high temperature and vaporizes the fuel in said fuel supply duct.

References Cited in the file of this patent

UNITED STATES PATENTS

| | | |
|---|---|---|
| 2,483,045 | Harby | Sept. 27, 1949 |
| 2,486,990 | Sharpe | Nov. 1, 1949 |
| 2,531,761 | Zucrow | Nov. 28, 1950 |
| 2,592,938 | McNaught | Apr. 15, 1952 |
| 2,620,625 | Phaneuf | Dec. 9, 1952 |
| 2,631,429 | Jacklin | Mar. 17, 1953 |
| 2,644,298 | McLeod et al. | July 7, 1953 |
| 2,697,482 | Blizard | Dec. 21, 1954 |
| 2,709,889 | Mount | June 7, 1955 |
| 2,709,895 | Mount | June 7, 1955 |
| 2,754,655 | Holzwarth | July 17, 1956 |